United States Patent [19]

Ranney

[11] Patent Number: 4,571,087

[45] Date of Patent: Feb. 18, 1986

[54] ARRAY SONICATOR APPARATUS FOR AUTOMATED SAMPLE PREPARATION

[75] Inventor: David F. Ranney, Dallas, Tex.

[73] Assignee: Board of Regents, University of Texas System, Austin, Tex.

[21] Appl. No.: 477,612

[22] Filed: Mar. 22, 1983

[51] Int. Cl.[4] ........................ B01F 11/02; B01F 15/06; G01N 21/64

[52] U.S. Cl. ........................................ 366/108; 108/21; 108/143; 108/145; 366/149; 366/212; 366/240; 422/65

[58] Field of Search .................... 108/20, 21, 143, 145; 366/108, 109, 110, 111, 116, 127, 142, 149, 208, 209, 212, 240, 601; 422/65, 99, 102

[56] References Cited

U.S. PATENT DOCUMENTS

| | | | |
|---|---|---|---|
| 2,754,426 | 7/1956 | Schiring | 108/143 |
| 2,916,266 | 12/1959 | Pray | 366/127 |
| 3,155,383 | 11/1964 | Whitmore | 108/20 |
| 3,459,505 | 8/1969 | Tweed | 436/5 |
| 3,495,519 | 2/1970 | Alfsen . | |
| 3,572,680 | 3/1971 | Neff | 108/20 |
| 3,635,446 | 1/1972 | Kurosawa . | |
| 3,638,933 | 2/1972 | Burnette . | |
| 3,906,120 | 9/1975 | Geating . | |
| 4,086,057 | 4/1978 | Everett . | |
| 4,226,191 | 10/1980 | Espana | 108/20 |
| 4,242,968 | 1/1981 | Schaidl et al. | 108/143 |
| 4,264,559 | 4/1981 | Price | 422/99 |

OTHER PUBLICATIONS

"This is Paramax TM ", American Dade, ©1981, American Hospital Supply Corporation.

Semiautomated Microfluorometric Instrument and Reagent System for Monitoring Disease-Related Immunosuppression; David F. Ranney and Alfred J. Quattrone; Clinical Chemistry, vol. 28, No. 9, 1982.

A Microfluorometric Mithramycin Assay for Quantitating the Effects of Immunotoxicants on Lymphocyte Activation; Alfred J. Quattrone, David F. Ranney; Journal of Toxicology and Environmental Health, 8:1015-1026, 1981.

*Primary Examiner*—Philip R. Coe
*Assistant Examiner*—Scott J. Haugland
*Attorney, Agent, or Firm*—Arnold, White & Durkee

[57] ABSTRACT

Apparatus is disclosed for automatically sonicating microtiter trays and arrays of test tubes, vials, and other small sample containers. An inverted cuphorn on an ultrasonic transducer introduces sonic energy through an extended fluid bath, on a one-by-one basis, into sample containers partially immersed therein. Stepped or continuous movement sample container positioning is by an x-y positioning table driven by reversible motors under the direction of an electromechanical controller. The dwell time of each sample container in the sonic energy field is selectable.

8 Claims, 5 Drawing Figures

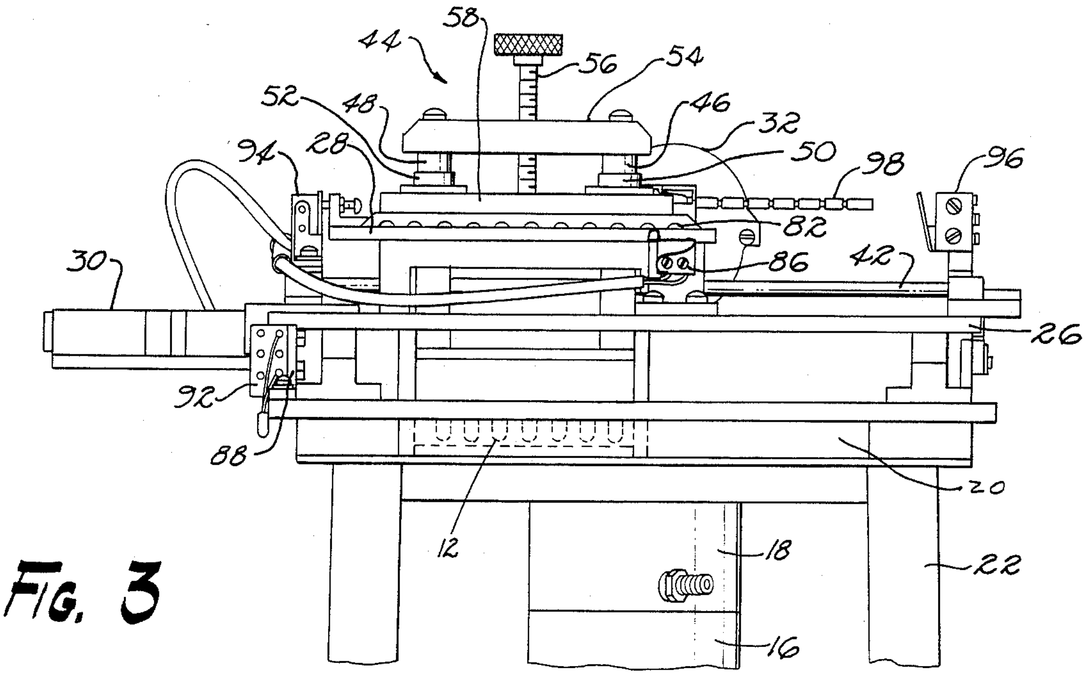
FIG. 3
FIG. 4
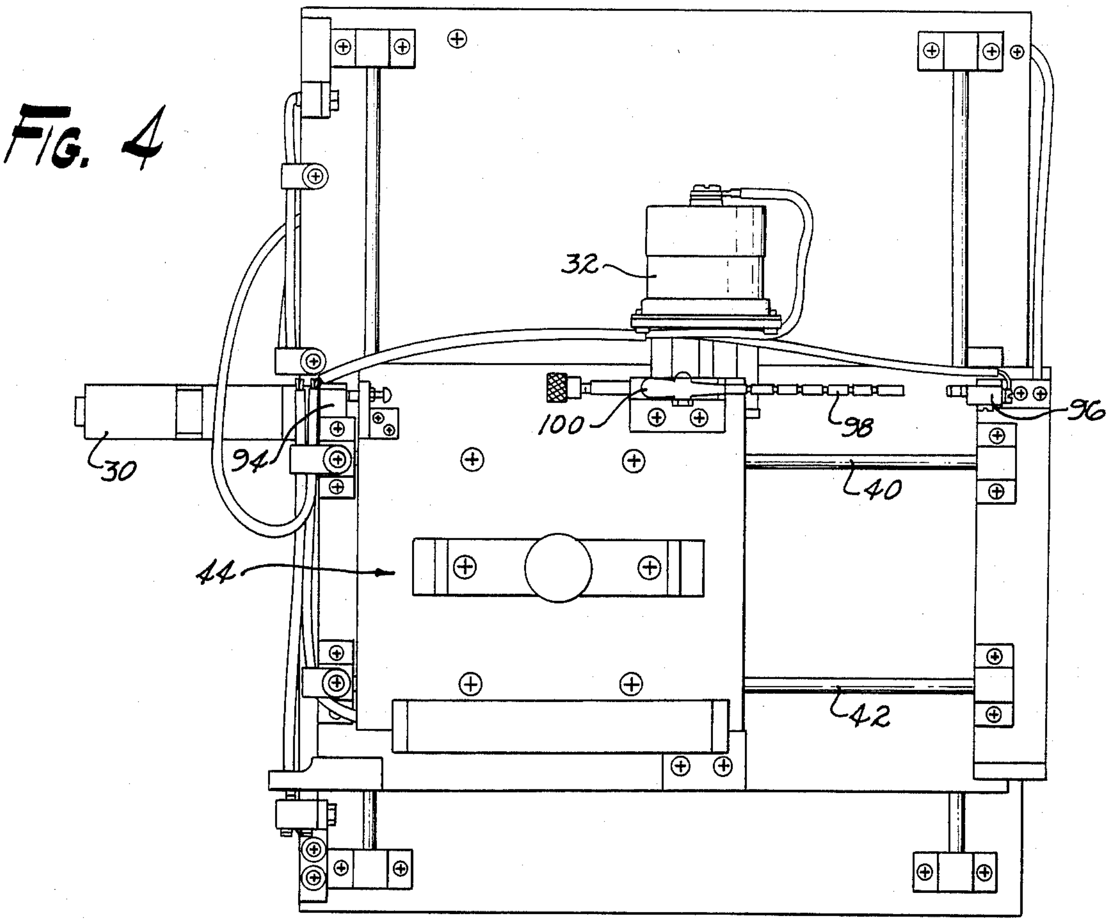

ARRAY SONICATOR APPARATUS FOR AUTOMATED SAMPLE PREPARATION

BACKGROUND OF THE INVENTION

The present invention relates to sonication apparatus, particularly for use in immunology, microbiology and clinical chemistry research and analysis laboratories.

In various clinical laboratory operations there arises the need to use sonication. The need arises in such situations as: the disruption and fractionation of cells; cell fusion; suspension and dispersion of bacteria, viruses, chromosomes, and small particles; timed mixing of two-phase chemical and biochemical reactants; and the cleaning of microsurgical specimens and instruments. For example, sonication is used in a fluorescence-enhancement assay for measuring immunosuppressors. In the assay, peripheral blood lymphocytes are activated with mitogens in standard microtiter culture trays. Changes in lymphocyte DNA content are quantified with a reagent formulation containing mithramycin, the fluorescence of which is enhanced on binding to DNA in the presence of $MgCl_2$. Cells are solubilized using sonication and fluorescence is measured with a photoncounting fluorometer.

Heretofore, the sonication has been done manually using a microtip sonicator probe inserted individually into the contents of each sample container, or alternatively by inserting single samples individually into a standard inverted cuphorn sonicator. As a consequence, assays such as the above-mentioned type have been restricted to selected research situations, because it is not feasible to manually process large numbers of samples as required in clinical situations. Presently available, large sonicator baths which have been designed for cleaning instruments and materials, cannot generate sufficient magnitudes of sonic energy uniformly throughout the baths for disruption-dispersion of array samples introduced inside secondary sample containers.

SUMMARY OF THE INVENTION

The present invention provides apparatus for rapid, automated sonication of each sample in an array comprising a plurality of sample containers. More specifically, the present invention provides apparatus for performing automated sonication of cultured cells in microtiter trays for uniform solubilization of same. Additionally, the present invention provides apparatus for performing automated sonication of a plurality of samples in an array for providing cellular, bacterial and particulate disruptions, nondisrupted suspensions and two-phase solvent mixtures.

Apparatus in accordance with the present invention for automatically sonicating each of a plurality of sample containers in an array includes a sonicator device for producing a shaped sonic energy field directed along a defined propagation path. A mechanism is provided for translating the array of sample containers between locations in plane transverse to the sonic energy field propagation path. A controller directs the translating mechanism so as to sequentially position each sample container of the array within the sonic energy field for a predetermined exposure time.

In a preferred embodiment, a plurality of sample containers is established in an array by means of a microtiter tray. Additionally, the array translating mechanism moves the array between coordinates in an x-y plane. Furthermore, the array translating mechanism is an x-y positioning table including a support base having a first table mounted thereon for bidirectional movement along an x-axis and a second table mounted on the first table for bidirectional movement relative thereto along a y-axis. Movement of the first and second tables is by individual reversible motors.

The controller for the translating mechanism includes means for activating the translating mechanism to move the sample container array and means for sensing movement of the translating mechanism to a location that positions a sample container within the sonic energy field. In response to a signal produced by the sensing means, additional means maintains the disposition of the translating mechanism over a predetermined dwell time. The activating means and sensing means may comprise a circuit utilizing interconnected relays and limit switches.

In an embodiment wherein the sample containers are in an array comprising a plurality of adjacent rows and the translating mechanism moves the sample container array in first and second mutually-perpendicular directions, the controller directs the translating mechanism to step the array of sample containers along in the first direction to sequentially position each sample container in a row of the array within the sonic energy field for a predetermined dwell time. Additionally, the controller includes means for sensing that the last container in a row of the array has been sonicated, whereupon the controller directs the translating mechanism to step the array of sample containers in the second direction to position an adjacent row of containers for advancement through the sonic energy field.

The controller may further include a counter for counting the number of sonication cycles through which an array has been processed. The counting of sonication cycles may be in response to an initializing location signal produced by means for sensing disposition of the sample container array at an initializing location. The controller may further include means for sensing that the final one of the sample containers in the array has been sonicated and actuating the translating mechanism to move the array to a predetermined initializing location. The sensing means may comprise a limit switch.

Further in accordance with the present invention, apparatus for sonication of an array of sample containers may further include an extension fluid bath into which at least a portion of the array sample containers are immersed. The fluid bath provides for sonic coupling of the sonic energy field to a sample container. Furthermore, the fluid bath may be circulating, thereby providing a cooling effect to prevent sample overheating or to maintain samples at preselected temperatures for specific assay purposes. Circulation of the bath fluid may be by a recirculating pump or a flow-siphon system.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein:

FIG. 3 is a plan view of the translation mechanism;

FIG. 4 is a frontal elevation view of the translation mechanism; and

DETAILED DESCRIPTION OF A PREFERRED EMBODIMENT

Referring now to FIGS. 1–4, there is shown array sonication apparatus 10 in accordance with the present invention. Apparatus 10 provides for automatic sonication of each of a plurality of sample containers established in an array. In the embodiment shown, the sample container array comprises a microtiter tray 12. The sonication of each well of the microtiter tray is by a means of producing a shaped sonic energy field directed through an energy transmission medium along a defined propagation path. The transmission medium is preferably a fluid, but can also be a semi-solid (i.e., gel) or a solid material.

Figure 2:
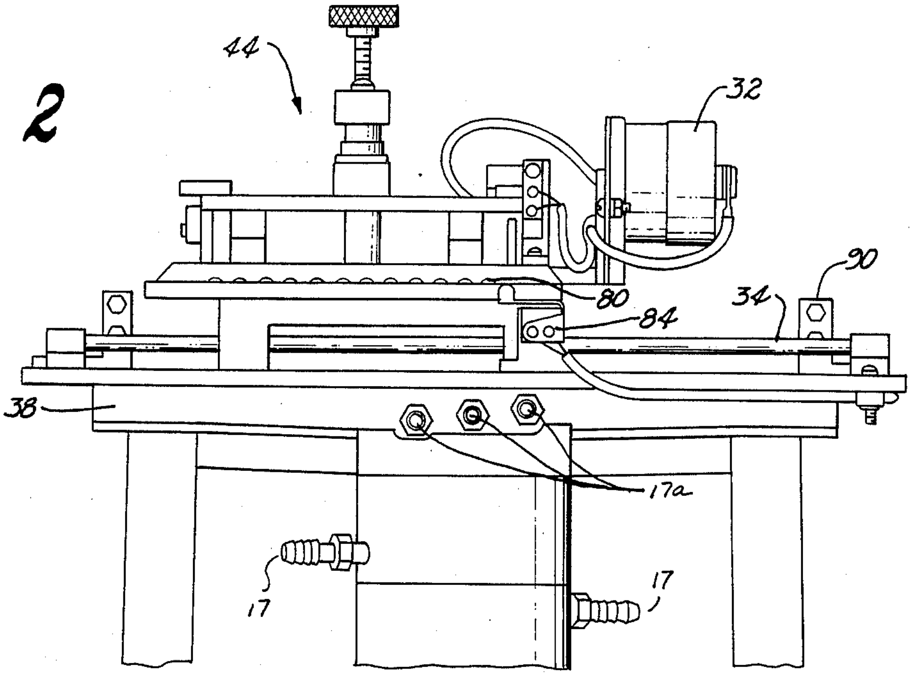
FIG. 2 is a side elevation view of the translation mechanism and its support stand.

In the embodiment shown, the sonic energy field is produced by an ultrasonic processor comprising an ultrasonic transducer 14 having a horn 16 enclosed within a cup 18 and a signal generator for driving the ultrasonic converter transducer. Preferably, the ultrasonic processor is the Model W-370 SONICATOR DISRUPTOR, manufactured by Heat Systems Ultrasonics, Inc. of Plainview, N.Y. The cup horn is preferably a modified Model 431 A device also available from Heat Systems Ultrasonics, Inc. The cup horn is modified by truncation at the plane of the upper face of the horn. To the truncated cup horn is added an extension bath 20 (FIG. 3), beginning at the plane defined by the the truncation and extending upwardly. Preferably, the extension bath has a depth of about $2\frac{1}{8}$ centimeters. Fluid flow to the bath is via in flow ports generally designated by reference numeral 17 (FIG. 2). The outflow ports 17*a* are variously positioned to provide for different pre-selected depths of fluid in the bath. The converter, cup horn and extension bath are mounted for support by a stand 22.

The sonic energy field propagation path from the ultrasonic converter transducer is, of course, directed vertically upward in a direction z. Apparatus 10 further includes means for translating the microtiter tray 12 between locations in a plane transverse to the sonic energy field propagation path. In the embodiment being described wherein the sample container array comprises a microtiter tray, which arranges the sample containers in a plurality of adjacent rows, the translating means preferably moves the tray between coordinates in an x-y plane. The translating means is, therefore, preferably implemented by an x-y positioning mechanism mounted on support stand 22 over extension bath 20. The positioning mechanism is generally indicated by reference numeral 24.

Positioning mechanism 24 includes a first table 26 mounted on the support stand for bidirectional movement along the x-axis of the plane. A second table 28 is mounted on the first table for bidirectional movement relative thereto along the y-axis of the plane. A reversible electric motor 30 is provided for moving table 26, and a reversible electric motor 32 is provided for moving table 28. Each electric motor drives its respective table via a suitable interconnecting drive linkage, for example a rack and pinion gear arrangement. Bidirectional movement of x-axis table 26 is along first and second guide rails 34, 36 mounted on platform 38 atop stand 22. Similarly, bidirectional movement of y-axis table 28 is along first and second guide rails 40, 42 mounted on table 26.

Microtiter tray 12 is mounted to the x-y positioning mechanism by a carrier generally designated by reference numeral 44. Carrier 44 mounts to table 28 and provides for vertical adjustment of the positioning of microtiter tray 12 with respect to extension bath 20. The carrier 44 is best shown in FIG. 3, and comprises first and second vertical sliding posts 46, 48. These posts attach at their lower ends to the microtiter tray holder and extend upwardly through guide sleeves 50, 52 affixed to y-axis table 28. The posts are affixed at their upper ends to an interconnecting crossbar 54. Extending through crossbar 54 is a thumbscrew 56, the end of which is in abutment with guide sleeve crossbar 58. Thumbscrew 56 provides for adjustment of the carrier to establish the microtiter tray at a desired height above the upper face of cup horn 18. The bottom portion 45 of sample carrier 44 comprises a grooved and sleeved Jackson log loader configuration holder which accepts all standard, 96-position microtiter trays. Additionally, the bottom portion can be removed and other sample carriers substituted to thereby accommodate various-size test tubes, vials, and other sample containers to be distributed for array sonication.

Figure 1:
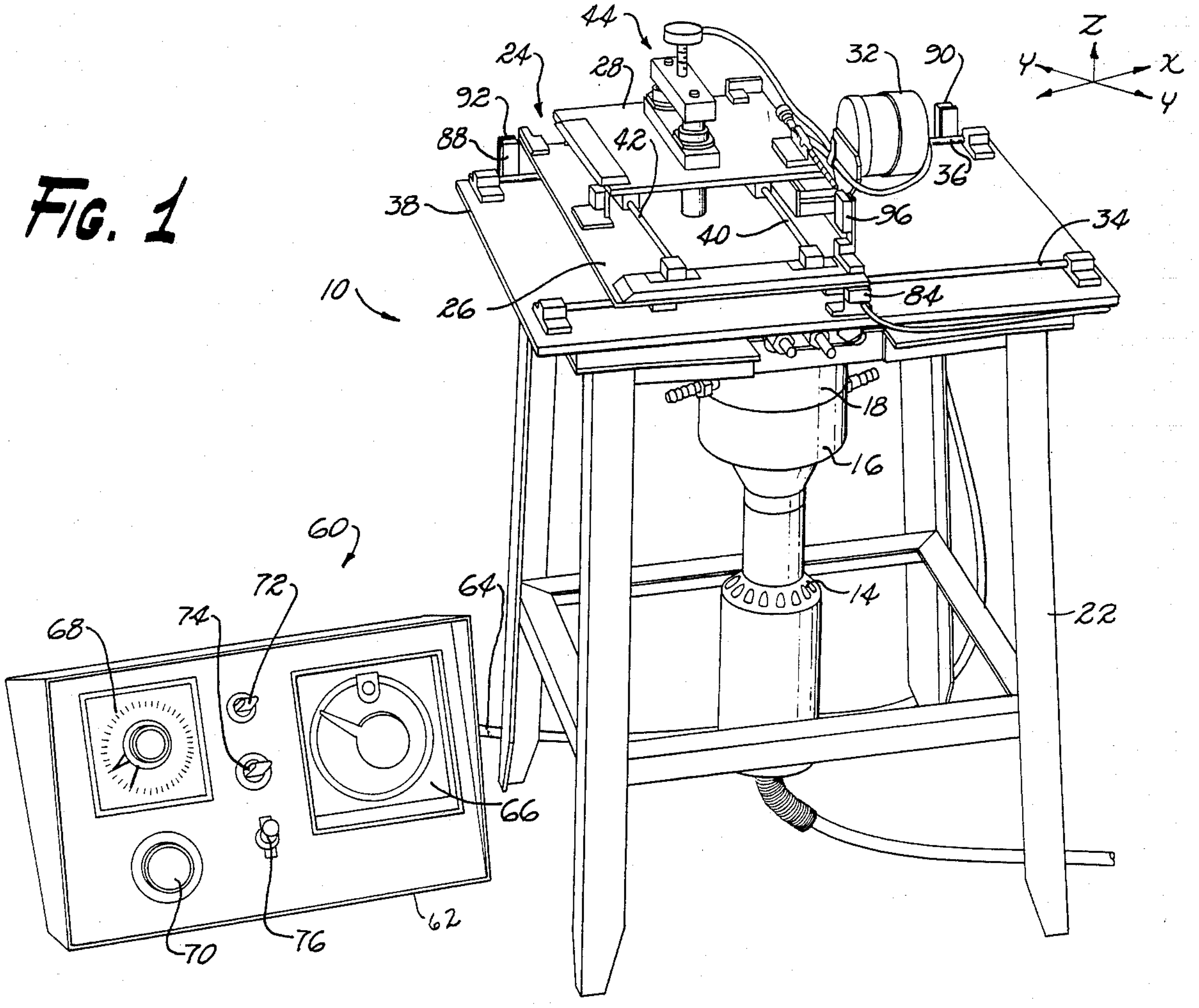
FIG. 1 is a perspective view of array sonication apparatus in accordance with the present invention showing the controller, the sonic energy producing device, and the container array translation mechanism.

Apparatus 10 further includes a controller 60 (FIG. 1) for directing the translating means to sequentially position each well of the microtiter tray within the sonic energy field, and for establishing the time of exposure. The housing 62, the front panel control knobs of controller 60, and the electrical cable 64 from the controller to the positioning mechanism are shown in FIG. 1. The front panel control knobs include a dial 66 for setting the number of sonication cycles through which the array of sample containers will be run. The number of cycles may be varied from one to eighty. Dial 68 is provided for setting the dwell time of each sample over the cup horn. The dwell time is selectable from 0.1 second to six hours. Dial 70 is provided for establishing the speed of the x-axis and y-axis drive motors 30, 32. Additionally, there is provided on the front panel of controller 60 a switch 72 for overriding counter selection dial 66, and a switch 74 for overriding the dwell time setting of dial 68. There is also, of course, an on-off switch 76.

In order to direct the translating means, position information must be provided. Accordingly, the controller includes means for sensing movement of the sample container array to one or more designated locations. In the preferred embodiment shown in the drawing figures, the sensing means comprises positioning indicia on the translating means and means for detecting the positioning indicia. In the embodiment shown in the drawing figures, the positioning indicia comprises a plurality of indentations 80 on table 26 (FIG. 2) and a plurality of indentations 82 on table 28 (FIG. 3). The means for detecting the indentations 80 comprises a limit switch 84. A similar switch 86 detects indentations 82. Each of the indentations 80 bears a defined positioning relationship with a sample container in each row of the array, and switch 84 is disposed in a defined positioning relationship with respect to the sonic energy field propagation path. Accordingly, positioning indicia 80 and limit switch 84 provide a means for sensing movement of the sample container array to a location that positions an array sample container within the sonic energy field, and for producing a signal indicative thereof.

In the embodiment shown in the drawing figures, it is further preferred that each indentation 82 bear a positioning relationship to one of the plurality of adjacent rows of sample containers in the array. Furthermore, switch 86 preferably bears a predetermined positioning relationship with respect to the sonic energy field propagation path. (See FIG. 3.) Accordingly, indentations 82 and switch 86 provide means for sensing movement of the translating means to a location that positions a row of sample containers for advancement toward the sonic energy field.

Further required in order to properly direct the translating means of the preferred embodiment being described is a means for determining that the last sample container in a row of the array has been sonicated. Accordingly, there is further provided first and second limit switches 88, 90 mounted on table 38 at opposite sides of table 26. Switches 88, 90 produce a signal when table 26 reaches the respective end of travel along rails 34, 36. Additionally, there is provided a limit switch 92 mounted adjacent switch 88. Switch 92 produces a signal to indicate that the sample container array is in an initializing location along its x-axis path of translation.

To indicate that table 28 is in an initializing position along the y-axis, limit switch 94 best shown in FIGS. 3 and 4 is provided. Additionally, means is provided for determining that the last row of sample containers in the array has been sonicated. Continuing with reference to FIGS. 3 and 4, the means chosen for the embodiment shown comprises a limit switch 96 mounted on table 26. Switch 96 is actuated upon engagement by bar 98 which is carried on table 28. Bar 98 is adjustable to provide for programmability of the switch actuation according to the number of rows of sample containers in the array. Programmability is provided by having bar 98 be variable in its length of extension from its latch holder 100 (FIG. 4). The programmer bar 98 best shown in FIG. 3 is provided with eight circumferential grooves spaced apart a distance corresponding to the spacing between adjacent rows of sample containers in the array. With the eight grooves, programmer bar 98 provides for termination of y-axis movement of table 28 after sonication of rows 1 through n, where n=1 to 8.

Figure 5:
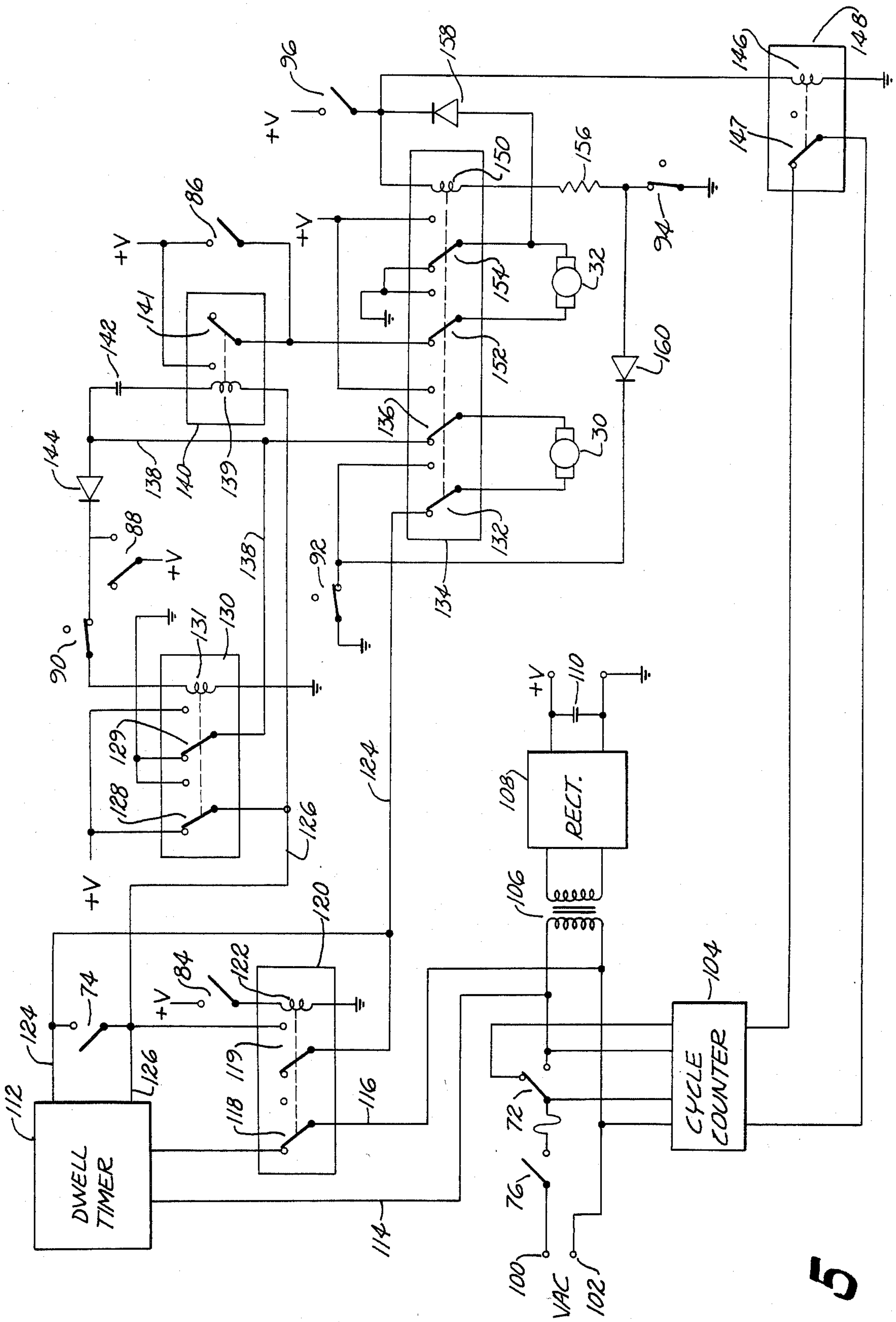
FIG. 5 is a schematic diagram of the electrical circuitry of the controller.

Referring now to FIG. 5, a schematic diagram of the electrical circuitry of the controller 60 is shown. Generally, the circuitry shown in FIG. 5 controls the operation of x-axis drive motor 30 and y-axis drive motor 32, to move tray 12 so as to position samples over the face of sonicator horn 18. The controller circuitry further operates to hold each sample in position for sonication over a predetermined time period established by an electromechanical timer. The controller circuitry causes a row of the tray 12 to scan or step over sonicator horn 18 in the x-axis direction, so as to sonicate each sample therein in the aforementioned manner, until movement in the x-axis direction results in a limit switch being reached. At that point, the controller circuitry directs the positioning means to advance tray 12 in the y-direction to position a second row for step scanning in the x-axis direction. When step scanning of the second row of the array is complete, as indicated by the actuation of a limit switch at the "home position", the circuitry then again directs movement of the tray in the y-axis direction to position the third row for step scanning. Back and forth step scanning of the rows in the sample container array continues until the last row is scanned. This condition is indicated by actuation of a limit switch, whereupon the circuitry directs movement of the translating means to return the tray to its initial position. With this summary of the controller circuitry operation in mind, attention is now directed to the specific implementation diagrammed in FIG. 5.

Alternating current electrical power is applied to the controller circuitry at terminals 100 and 102. Electrical power is supplied through on-off switch 76 and switch contacts in cycle counter 104 to step-down transformer 106. Preferably, available at the secondary of transformer 106 is a 24 VAC output. The electrical power available from transformer 106 is rectified by rectifier 108 and filtered by capacitor 110 to make available a DC voltage of 24 volts for operating the relays and motors. The DC output voltage is indicated by the symbol +V. Cycle counter 104 can be bypassed by counter override switch 72.

Alternating current electrical power is obtained from the primary of transformer 106 and applied to dwell timer 112 over conductors 114 and 116. Dwell timer 112 is preferably an electromechanical timer which controls on a timed basis via internal relay contacts the connection between conductors 124 and 126. The connection path defined by conductor 116 includes contactor 118 in relay 120. When relay coil 122 is not energized, contactor 118 is in the position shown for supplying electrical power to dwell timer 112, so as to close the internal relay contacts and interconnect conductors 124 and 126.

The operation of dwell timer 112 can be bypassed by dwell time override switch 74. This results in continuous scanning versus the usual stepped positioning of array samples over sonicator horn 18.

Assuming the sample container array to be at the initializing or home position, when on-off switch 76 is closed, DC electrical power is provided to x-axis motor 30. Specifically, power is supplied through contactor 128 of relay 130 and over conductor 126 to dwell timer 112. Because the internal contacts of dwell timer 112 are closed, which connects conductor 126 to conductor 124, current flows through conductor 124 to contactor 132 of relay 134. Current flow through motor 30 further passes through contactor 136 of relay 134 to conductor 138 which is connected to contactor 129 of relay 130. Contactor 129 is connected to circuit ground. After x-axis motor 30 begins to drive the x-axis table 26, limit switch 84, which is a normally open switch, closes to energize relay coil 122, and thereby actuate contactors 118 and 119 in relay 120. Actuation of contactor 118 opens the internal contacts of dwell timer 112. Actuation of contactor 119 establishes a connection between conductors 124 and 126 to maintain power to motor 30.

Upon movement of table 26 to a location along the x-axis which positions the first sample container in the first row of the array within the propagation path of the sonic energy field from sonicator horn 18, positioning indicia comprising an indentation 80 causes limit switch 84 to be released to assume its normally open condition. When limit switch 84 opens, releasing the contactors of relay 120, power to motor 30 is disrupted and dwell timer 112 is activated. After the dwell timer times out the predetermined dwell period, its internal contacts close reestablishing a connection between conductors 124 and 126. This establishes electrical current flow to motor 30 and movement of table 26 resumes. Again, limit switch 84 then closes, dwell timer 112 is deactivated, and current flow between conductors 124 and 126 is established through contactor 119. When the next sample container in the array is in position for sonication, a corresponding indentation 80 on table 26 moves into registration with limit switch 84, whereupon motor 30 is again stopped and dwell timer is activated.

The foregoing operation is repeated until the last sample in the first row of the array is sonicated. At that point, movement of table 26 by motor 30 results in actuation of limit switch 88. Closure of switch 88 results in current flow through limit switch 90 and relay coil 131. When relay coil 131 is energized, contactors 128 and 129 of relay 130 are actuated to reverse the polarity of the DC electrical power to be applied to motor 30. Reversal of the polarity, of course, will cause drive motor 30 to run in the reverse direction.

Additionally, actuation of contactor 128 serves to ground the lower end of relay coil 139 in relay 140. The other side of relay coil 139 is connected to capacitor 142, which is in turn connected to conductor 138. Coil 139 is energized until capacitor 142 is charged. The momentary energization of relay coil 139 results in contactor 141 being momentarily actuated to apply DC electrical power to y-axis drive motor 32. When motor 32 begins to produce movement of table 28, normally open limit switch 86 is closed to maintain electrical power to motor 32. Motor 32 continues to drive table 28 in the y-axis direction until an indentation 82, which indicates positioning of the second row of the array for step scanning, comes into registration with limit switch 86, whereupon limit switch 86 is released and power to motor 32 is disrupted. At this point, the second, adjacent row of the sample container array is in position for step scanning through the sonic energy field of sonicator horn 18.

Sequential movement of table 26 in the reverse x-axis direction, as a result of motor 30 being driven in reverse, proceeds in the same manner as movement of table 26 in the forward x-axis direction. That is, table 26 is moved until an indentation 80 registers with limit switch 84 resulting in disruption of current flow to motor 30 and activation of dwell timer 112. At the end of reverse movement of table 26, which comes about following sonication of the last sample container container in the second row of the array, limit switch 90 is opened. This releases contactors 128 and 129 of relay 130 and, of course, reverses the polarity of the DC electrical energy to be applied to motor 30. Simultaneously, capacitor 142 is discharged and current flow commences through relay coil 139. Coil 139 is momentarily energized, resulting in closure of contactor 141, whereupon y-axis drive motor 32 is energized and drives table 28 in the y-axis direction. Movement of table 28 results in actuation of limit switch 86 to the closed position, so as to maintain electrical power to motor 32. Electrical power is maintained to motor 32 until table 28 moves to a position at which an indentation 82 corresponding to the third row of the sample container array is in registration with limit switch 86. Upon this occurrence, limit switch 86 opens and electrical power is removed from motor 32.

X-axis motor 30 is energized to drive table 26 to sequentially position each sample container in the third row of the array within the sonic energy field of transducer 14. Again, operation proceeds in the manner previously described. When the last sample container in the last row of the array has been sonicated, limit switch 96 is closed, resulting in energization of coil 146 in relay 148. Contactor 147 is actuated and produces a signal pulse to cycle counter 104. If the completed sonication cycle is the last cycle to be run, cycle counter 104 will open its internal contacts and remove incoming electrical power from transformer 106. If the completed cycle is not the last cycle to be run, then power continues to be supplied.

Closure of limit switch 96 also energizes coil 150 in relay 134. This results in actuation of contactors 132, 136, 152 and 154 of relay 134. Upon such actuation, both motors are supplied with DC electrical power, which causes them to drive tables 26 and 28 to the initializing or home position.

Current through relay coil 150 also flows through series resistor 156 and normally closed limit switch 94 to ground. Resistor 156 serves to add a voltage drop so that relay 134 can be implemented using a 12 volt relay. Relay coil 150 continues to be energized after limit switch 96 opens by reason of current supplied thereto through diode 158. Forward biasing of diode 158 occurs as a result of the actuation of contactor 154. Relay coil 150 remains energized until both table 26 and table 28 have returned to the home position. When table 26 has returned, limit switch 92 opens disrupting current flow through motor 30. Similarly, when table 28 reaches the home position, limit switch 94 is opened. When both limit switches 92 and 94 are open, coil 150 is deenergized and the contactors of relay 134 return to the position shown. At that point, a new sonicator cycle of the array commences.

Variable potentiometers 170 and 178 are controlled by dial 70 to vary the voltage to the x-axis and y-axis motors, 30 and 32, respectively, thereby providing variable-speed scanning of the array samples.

The foregoing description of the invention has been directed to a particular preferred embodiment for purposes of explanation and illustration. It will be apparent, however, to those skilled in this art that many modifications and changes in the apparatus may be made without departing from the essence of the invention. It is the Applicants' intention in the following claims to cover all equivalent modifications and variations as fall within the scope of the invention.

What is claimed is:

1. Apparatus for automatically sonicating the contents of each of a plurality of sample containers arranged in a planar, two-dimensional array, comprising:

means for emitting a shaped ultrasonic energy field directed along a defined propagation path and of sufficient intensity to produce sonication of the contents of a sample container;

an extension bath disposed adjacent the sonication means in a plane transverse to the propagation path of the ultrasonic energy field, for providing sonic coupling of the ultrasonic energy field to the contents of a sample container to provide sonication thereof;

means mounting the array of sample containers for translational movement between locations in a plane transverse to the propagation path of the ultrasonic energy field;

means for adjusting the position of the array of sample containers transversely with respect to the plane of the extension bath, to immerse a predetermined portion of each sample container therein and provide control of the sonicating effect on the contents of the sample containers; and a controller for automatically directing the array translational movement means to individually place by stepped movement each sample container of the array into the path of the ultrasonic energy field.

2. The apparatus of claim 1 further comprising a microtiter tray for establishing the sample containers in an array.

3. The apparatus of claim 1 wherein said array translating means moves the array between coordinates in an x-y plane and comprises:

a support base;

a first table mounted on the support base for bidirectional movement along an x-axis of the plane;

a second table mounted on the first table for bidirectional movement relative thereto along a y-axis of the plane;

a first reversible motor for moving the first table; and a second reversible motor for moving the second table.

4. The apparatus of claim 1 wherein said controller comprises:

means for activating the translating means to move the sample container array;

means for sensing movement of the array to a location that positions an array sample container within the sonic energy field and producing a signal indicative thereof; and means responsive to said signal, for maintaining over a predetermined dwell time disposition of the translating means at a location that positions an array sample container within the sonic energy field.

5. The apparatus of claim 1 wherein:

(a) the array translational movement includes a mechanism for moving the sample container array in first and second mutually perpendicular directions; and (b) the controller includes means for controlling said mechanism to step the array of sample containers along in the first direction, to sequentially position each sample container in a row of the array within the ultrasonic energy field for a predetermined dwell time; and means for determining that the last container in a row of the array has been sonicated and controlling said mechanism to step the array of sample containers in the second direction, to position an adjacent row of containers for advancement through the ultrasonic energy field.

6. The apparatus of claim 5 further comprising:

means for determining that the last row of the array has been sonicated, and for actuating said mechanism to move the array in both the first and second directions to an initializing location;

means for sensing that the array has arrived at the initializing location and producing a signal indicative thereof; and a counter responsive to said initializing location signal, for counting the number of sonication cycles through which the array has been processed.

7. Apparatus for automatically sonicating each of a plurality of sample containers, comprising:

(a) means for establishing the sample containers in an array comprising a plurality of adjacent rows disposed within a Cartesian plane wherein each sample container defines a point;

(b) means for producing a shaped sonic energy field having a narrow beam radiation pattern directed along a defined propagation path;

(c) a mechanism for moving the sample container array between locations in a plane transverse to the sonic energy field propagation path along first and second mutually perpendicular paths, said mechanism including (i) a support base, (ii) a first table mounted on the support base for bidirectional movement along the first path and having positioning indicia thereon in a defined relationship with the adjacent rows of the array, (iii) a second table mounted on the first table for bidirectional movement relative thereto along the second path and having positioning indicia thereon in a defined relationship with corresponding sample containers in each row of the array, (iv) a first reversible motor for moving the first table, (v) a second reversible motor for moving the second table;

(d) a controller for actuating the mechanism to sequentially position each sample container of the array within the sonic energy field, and for establishing the exposure time of a sample container to the sonic energy, said controller including (i) means for causing the second motor to move the second table so as to advance a row of sample containers toward the sonic energy field, (ii) means for detecting the positioning indicia on the second table, and for producing a first signal indicative of the advancement of the sample container array to a location that positions an array sample container in said row within the sonic energy field, (iii) means responsive to said first signal, for maintaining over a predetermined dwell time the disposition of the second table that resulted in said array sample container being positioned within the sonic energy field, (iv) means for detecting that the last array sample container in a row has been sonicated, cated, and for producing a second signal indicative thereof, (v) means responsive to said second signal for causing the first motor to move the first table, and (vi) means for detecting the positioning indicia on the first table and producing a signal indicative of the movement of the sample container array to a location that positions a row of sample containers for advancement toward the sonic energy field.

8. The apparatus of claim 1, wherein the extension bath is a recirculating fluid bath for providing cooling of the contents of the sample containers.

* * * * *

UNITED STATES PATENT AND TRADEMARK OFFICE
CERTIFICATE OF CORRECTION

PATENT NO. : 4,571,087

DATED : February 18, 1986

INVENTOR(S) : David F. Ranney

It is certified that error appears in the above-identified patent and that said Letters Patent is hereby corrected as shown below:

Column 3, line 39, delete "2 1/8" and insert --2 1/2--; line 40, delete "in flow" and insert --inflow--.

Column 1, line 24, delete "sonication and" and insert --sonication, and--.

Column 3, line 5, delete "is a plan view of the translation mechanism" and insert --is a frontal elevation view of the translation mechanism--; lines 6-7, delete "is a frontal elevation view of the translation mechanism" and insert --is a plan view of the translation mechanism--.

Column 4, line 23, delete "bottom portion 45" and insert --bottom portion--.

UNITED STATES PATENT AND TRADEMARK OFFICE
CERTIFICATE OF CORRECTION

PATENT NO. : 4,571,087 Page 2 of 2

DATED : February 18, 1986

INVENTOR(S) : David F. Ranney

It is certified that error appears in the above-identified patent and that said Letters Patent is hereby corrected as shown below:

Column 8, line 33, delete "potentiometers 170 and 178" and insert --potentiometers, associated with the x-axis and y-axis motors, 30 and 32, respectively, --.

Signed and Sealed this

*Twenty-ninth* Day of *July 1986*

[SEAL]

*Attest:*

DONALD J. QUIGG

*Attesting Officer* *Commissioner of Patents and Trademarks*